US009252555B2

(12) United States Patent
Li et al.

(10) Patent No.: US 9,252,555 B2
(45) Date of Patent: Feb. 2, 2016

(54) FREQUENCY-STABILIZED RANDOM DISTRIBUTED FEEDBACK FIBER RING LASER WITH LOW INTENSITY NOISE

(71) Applicant: University of Ottawa, Ottawa (CA)

(72) Inventors: Yang Li, Ottawa (CA); Ping Lu, Ottawa (CA); Xiaoyi Bao, Ottawa (CA); Zhonghua Ou, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 33 days.

(21) Appl. No.: 14/636,432

(22) Filed: Mar. 3, 2015

(65) Prior Publication Data

US 2015/0255944 A1 Sep. 10, 2015

Related U.S. Application Data

(60) Provisional application No. 61/948,068, filed on Mar. 5, 2014.

(51) Int. Cl.
| | |
|---|---|
| *H01S 3/067* | (2006.01) |
| *H01S 3/13* | (2006.01) |
| *H01S 3/094* | (2006.01) |
| *H01S 3/0941* | (2006.01) |

(52) U.S. Cl.
CPC .......... *H01S 3/0675* (2013.01); *H01S 3/06712* (2013.01); *H01S 3/06716* (2013.01); *H01S 3/06791* (2013.01); *H01S 3/0941* (2013.01); *H01S 3/094003* (2013.01); *H01S 3/1305* (2013.01)

(58) Field of Classification Search
CPC .............. H01S 3/06791; H01S 3/0675; H01S 3/06712; H01S 3/06716; H01S 3/094003; H01S 3/1305
See application file for complete search history.

(56) References Cited

U.S. PATENT DOCUMENTS

| | | | | |
|---|---|---|---|---|
| 2009/0003391 | A1* | 1/2009 | Li | ...................................... 372/6 |
| 2009/0153844 | A1* | 6/2009 | Peter et al. | ..................... 356/128 |
| 2010/0061408 | A1* | 3/2010 | Nakazawa et al. | ................ 372/6 |

OTHER PUBLICATIONS

Pang et al., "Frequency stabilized coherent Brillouin random fiber laser: theory and experiments", Optics Express, vol. 21, No. 22, pp. 27155-27168 (Nov. 2013).
Lizarraga et al., "Single-mode Er-doped fiber random laser with distributed Bragg grating feedback", Optics Express, vol. 17, No. 2, pp. 395-404 (Jan. 2009).
Gagne et al., "Demonstration of a 3 mW threshold Er-doped random fiber laser based on a unique fiber Bragg grating", Optics Express, vol. 17, No. 21, pp. 19067-19074 (Oct. 2009).

(Continued)

*Primary Examiner* — Jessica Stultz
*Assistant Examiner* — Marcia Golub-Miller
(74) *Attorney, Agent, or Firm* — Alchemy-Partners, PC (57) ABSTRACT

A method and apparatus for producing single mode random fiber ring laser by inducing random distributed feedback in a short section of the fiber ring to thereby enable single mode lasing while reducing frequency jitter and relative intensity noise. The random distributed feedback maybe achieved through deep refractive index modulation at a series of randomly distributed laser-irradiated points inscribed along the length of the induced random distributed feedback fiber. The laser-processed random distributed feedback fiber maybe incorporated into the fiber ring in conjunction with a variable optical attenuator and band pass optical filter for enhancing the single mode operation.

14 Claims, 11 Drawing Sheets

(56) References Cited

OTHER PUBLICATIONS

Puente et al., "Fabrication, characterization, and theoretical analysis of controlled disorder in the core of optical fibers", Applied Optics, vol. 50, No. 6, pp. 802-810 (Feb. 2011).
International Search Report and Written Opinion received in PCT Application No. PCT/IB2015/051589, mailed Jun. 16, 2015.
N. M. Lawandy, R. M. Balachandran, A. S. L. Gomes, and E. Sauvain, Nature 368, 436 (1994).
G. R. Williams, S. B. Bayram, S. C. Rand, T. Hinklin, and R. M. Laine, Phys. Rev. A 65, 013807 (2001).
H. Cao, Waves Random Media 13, R1 (2003).
R. C. Polson and Z. V. Vardeny, Appl. Phys. Lett. 85, 1289 (2004).
S. Gottardo, S. Cavalieri, O. Yaroshchuk, and D. S. Wiersma, Phys. Rev. Lett. 93, 263901 (2004).
S. K. Turitsyn, S. A. Babin, A. E. El-Taher, P. Harper, D. V. Churkin, S. I. Kablukov, J. D. Ania-Castanon, V. Karalekas, and E. V. Podivilov, Nat. Photon. 4, 231 (2010).
A. A. Fotiadi, Nat. Photon. 4, 204 (2010).
M. Pang, X. Bao, and L. Chen, Opt. Lett. 38, 1866 (2013).
C. J. S. de Matos, L. de S. Menezes, A. M. Brito-Silva, M. A. Martinez Gámez, A. S. L. Gomes, and C. B. de Araújo, Phys. Rev. Lett. 99, 153903 (2007).
M. Gagné and R. Kashyap, Opt. Express 17, 19067 (2009).
N. Lizárraga, N. P. Puente, E. I. Chaikina, T. A. Leskova, and E. R. Méndez, Opt. Express 17, 395 (2009).
Z. Hu, B. Miao, T. Wang, Q. Fu, D. Zhang, H. Ming, and Q. Zhang, Opt. Lett. 38, 4644 (2013).
M. Pang, S. R. Xie, X. Y. Bao, D. P. Zhou, Y. G. Lu, and L. Chen, Opt. Lett. 37, 3129 (2012).
J. D. D Ania Castañón, S. A. Babin, D. V. Churkin, A. El-Taher, P. Harper, S. I. Kablukov, V. Karalekas, V. K. Mezentsev, V. Podivilov, and S. K. Turitsyn, Phys. Rev. Lett. 103, 133901 (2009).
Y. J. Rao, Y. P. Wang, Z. L. Ran, and T. Zhu, J. Lightwave Technol. 21, 1320 (2003).
D. Derickson, Fiber optic test and measurement, (Prentice Hall PTR, Upper Saddle River, NJ, USA, 1998).
S. A. Babin, A. E. El-Taher, P. Harper, E. V. Podivilov, and S. K. Turitsyn, Physical Review A 84, 021805 (2011).
T. Zhu, X. Bao, and L. Chen, J. Lightwave Technol. 29, 1802 (2011).
C. Spiegelberg, J. Geng, Y. Hu, Y. Kaneda, S. Jiang, and N. Peyghambarian, J. Lightwave Technol. 22, 57 (2004).
C. B. Su, J. Schlafer, and R. B. Lauer, Appl. Phys. Lett. 57, 849 (1990).
D. W. Allan, IEEE. Trans. Ultrason. Ferroelectr. Freq. Control. 34, 647 (1987).

* cited by examiner

FREQUENCY-STABILIZED RANDOM DISTRIBUTED FEEDBACK FIBER RING LASER WITH LOW INTENSITY NOISE

This application claims benefit of priority to U.S. Provisional Patent Application No. 61/948,068, entitled, "Narrow linewidth low frequency noise Er-doped fiber ring laser based on femtosecond laser induced random feedback," filed Mar. 5, 2014 which is incorporated herein by reference in its entirety.

BACKGROUND

1. Field of the Invention

The present invention relates to random fiber lasers. More specifically, the present invention is directed to high performance single-mode fiber lasers.

2. Related Art

In many conventional single-mode random distributed feedback (RDFB) laser systems the long length of a feedback fiber required for generation of random distributed feedback based on Rayleigh backscattering results in a high intensity noise and frequency instability thus degrading the performance of the RDFB laser. It would be highly desirable to have a randomly distributed feedback feature for realizing narrow linewidth single-mode lasing without incurring excessive intensity noise and frequency jitter in the laser signal.

SUMMARY

The foregoing needs are met, to a great extent, by the present invention wherein, according to a first broad aspect, the present invention provides a method comprising inducing random distributed feedback within one or more fiber sections of a fiber ring laser to thereby produce single-mode lasing with a reduced frequency jitter and a reduced relative intensity noise in the fiber ring laser. Inducing the random distributed feedback within the one or more fiber sections comprises modulating a refractive index at plurality of random points along the one or more fiber sections of the fiber ring laser.

According to a second broad aspect, the present invention provides an apparatus comprising a fiber ring laser comprising one or more random distributed feedback fiber sections configured to produce a single mode lasing with reduced frequency jitter and intensity noise in the fiber ring laser, wherein the one or more random distributed feedback fiber sections each comprise a plurality of randomly spaced refractive index modulation regions.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Definitions

Where the definition of terms departs from the commonly used meaning of the term, applicant intends to utilize the definitions provided below, unless specifically indicated.

For purposes of the present invention, it should be noted that the singular forms, "a," "an" and "the," include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing figures may be flipped over, rotated by 90° in any direction, reversed, etc.

For purposes of the present invention, a value or property is "based" on a particular value, property, the satisfaction of a condition or other factor if that value is derived by performing a mathematical calculation or logical operation using that value, property or other factor.

For the purpose of the present invention, the term "laser-modified" refers to the condition of being processed, treated or conditioned with a laser beam.

For purposes of the present invention, the term "backscattering" refers to the reflection of waves, particles, or signals back towards the direction from which they came. It is a diffuse reflection due to scattering, as opposed to specular reflection like a mirror.

For purposes of the present invention, the term "beat signal" refers to an interference signal produced by the superimposition of at least two signals with different frequencies. The frequency of the beat signal corresponds to the frequency difference between the superimposed signals.

For purposes of the present invention, the term "distributed feedback" refers to feedback source are spatially distributed across the propagation medium.

For purposes of the present invention, the term "distributed feedback fiber" refers to a fiber length comprising plurality of scattering centers distributed across at least a portion of its length. When an optical signal propagates through the fiber, a portion of the light is scattered backwards (in the opposite direction relative to the direction of propagation) by the distributed scattering centers. The backscattered signal acts as a distributed feedback signal and the fiber where the phenomena occurs is referred to as distributed feedback fiber.

For the purposes of the present invention, the term "random distributed feedback fiber" refers to a fiber length comprising plurality of randomly spaced scattering centers distributed across at least a portion of its length. When an optical signal propagates through the fiber, a portion of the light is scattered backwards (in the opposite direction relative to the direction of propagation) by the randomly spaced distributed scattering centers. The backscattered signal acts as a random distributed feedback (RDFB) signal and the fiber where the phenomena occurs is referred to as random distributed feedback (RDFB) fiber.

For purposes of the present invention, the term "gain medium" refers to a medium that acts as a source of optical gain for the light signal propagating therethrough.

For purposes of the present invention, the term "induced refractive index modulation" refers to changes in the refractive index at plurality of points along the length of a medium that have occurred through the action of one or more external sources, such as irradiation by intense laser pulse.

For purposes of the present invention, the term "laser-induced refractive index modulation" refers to permanent changes in the refractive index at plurality of points across a length or a portion of a length of an optical fiber that have occurred through irradiation by one or more laser pulse.

For the purposes of the present invention, the term "laser-irradiated index-modified points" refers to one or more points along a length of fiber where refractive index has been permanently changed through irradiation by laser beam.

For the purposes of the present invention, the term "refractive index modulation regions" refers to regions along a length of an optical medium such as an optical fiber where refractive index has been modified through, for example, exposure to an intense beam of laser.

For purposes of the present invention, the term "laser-modified distributed feedback fiber" refers a length of fiber containing distributed scattering sites created through laser-induced refractive index modulation at locations distributed along at least a portion of the length of an optical fiber.

For purposes of the present invention, the term "laser-modified random distributed feedback fiber" refers to a length of fiber containing randomly distributed scattering sites created through laser-induced refractive index modulation at locations randomly distributed along at least a portion of the length of the fiber.

For purposes of the present invention, the term "laser-written random distributed feedback fiber" maybe interchangeably used to refer to a laser-modified random distributed feedback fiber For purposes of the present invention, the term "laser-modified" refers to process where in optical, electrical or physical characteristic of a medium is modified through exposure to laser.

For the purposes of the present invention, the term "point-focused" refers to a state or condition of being focused to a point.

For purposes of the present invention, the term "laser-written" maybe interchangeably used to describe "laser-modified".

For purposes of the present invention, the term "optical circulator" refers to a multi-port optical device that may be used to route optical signals in such a way as to separate optical signals travelling in opposite directions.

For purposes of the present invention, the term "RDFB element" refers to a device, a propagation mediums, a structure or a combination of devices, propagation mediums and structures configured to produce a random distributed feedback (RDFB) signal.

For purposes of the present invention, the term "optical isolator" refers to an optical component which allows the transmission of light in only one direction.

For purposes of the present invention, the term "optical loss device" refers to a device for isolating a select frequency range from a set of frequencies contained within a signal.

For purposes of the present invention, the term "optical pump signal" refers to the optical signal launched into optical gain fiber in order to provide the initial energy required to initiate lasing.

For purposes of the present invention, the term "propagating" refers to causing to spread, to extend, to impel or continue forward in space; e.g., as, to propagate light.

For purposes of the present invention, the term "pumping" refers to the transfer of energy into a gain medium of a laser in order to initiate a lasing process.

For purposes of the present invention, the term "random distributed feedback" refers to an effective feedback signal that results from the combination of small optical back-reflections emanating from many randomly distributed scattering points along a medium.

For purposes of the present invention, the term "random distributed feedback fiber" refers to a length of fiber comprising scattering centers randomly distributed across at least a portion of its length. When an optical signal propagates through the fiber, a portion of it is scattered backwards (in the opposite direction relative to the direction of propagation) by the randomly distributed scattering centers. The backscattered signal acts as a random distributed feedback (RDFB) signal and the fiber where the phenomena occurs is referred to as random distributed feedback fiber (RDFB fiber).

For purposes of the present invention, the term "random fiber" refers to an optical fiber that acts as disordered gain medium for the light signal propagating through the optical fiber.

For purposes of the present invention, the term "wavelength selection" refers to a process or operation wherein one or more wavelength components in an optical signal are kept while all the other wavelength components in the optical signal are suppressed.

Description

While the present invention is disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof. It is understood that other embodiments may be utilized and structural changes may be made without departing from the scope of the invention.

Recently, random fiber lasers have gained increasing interest due to their improved lasing directionality and narrow linewidth over random lasers in bulk materials,[1,2,3,4,5] providing great opportunities for applications in sensing and telecommunications. The fiber geometry provides adequate transverse confinement of light waves and effective one-dimensional random feedback either by intrinsic inhomogeneity, e.g. Rayleigh scattering,[6,7,8] or induced randomness such as photonic crystal fiber filled with a suspension structure,[9] Bragg gratings in rare-earth-doped fiber,[10, 11] and polymer optical fiber.[12]

Randomly distributed feedback (RDFB) schemes based on Rayleigh backscattering (RBS) in single-mode fiber (SMF) have been of particular interest due to their ability to reduce cavity effects and lead to single-mode operation. Rayleigh scattering emanates from the structural inhomogeneity in fiber materials that are caused by frozen-in density or composition fluctuations. These structural perturbations, considered as local defects, are randomly distributed along optical fibers.[6,7,8,13] The multiple random reflections at RBS centers along the length of the fiber, acting as a distributed mirror, generates the random distributed feedback signal required for facilitating single mode lasing within the fiber. However, Due to the low RBS coefficient of fused silica glass fibers in their near-infrared transparency window, tens of kilometers of fibers are required for the generated RBS to create enough feedback to ensure a single-mode operation.[14] The long length of the feedback fiber degrades the performance of the RDFB laser resulting in high intensity noise and frequency instability. It would be highly desirable to have a randomly distributed feedback feature for realizing narrow linewidth single-mode lasing without incurring excessive intensity noise and frequency jitter in the laser signal.

In order to address the need for low relative intensity noise (RIN) and frequency stability (low frequency jitter) in conventional fiber laser systems based on long RBS based feedback fiber, the present invention provides an exemplary fiber ring laser wherein the RDFB, in accordance to one exemplary embodiment, is provided by 10 cm long SMF-28 with 100 randomly spaced $CO_2$ laser-irradiated points. The short feedback fiber, based on $CO_2$ laser modification on a standard telecommunication single-mode fiber, enables narrow linewidth single mode lasing while maintaining low intensity noise and frequency jitter as described below in select disclosed embodiments.

Accordingly, disclosed embodiments of the present invention provide a method and apparatus for the generation of a frequency stabilized, single mode fiber ring laser based on combined effect of enhanced randomly distributed feedback mechanism and drastically reduced random distributed feedback fiber length.

Figure 1:
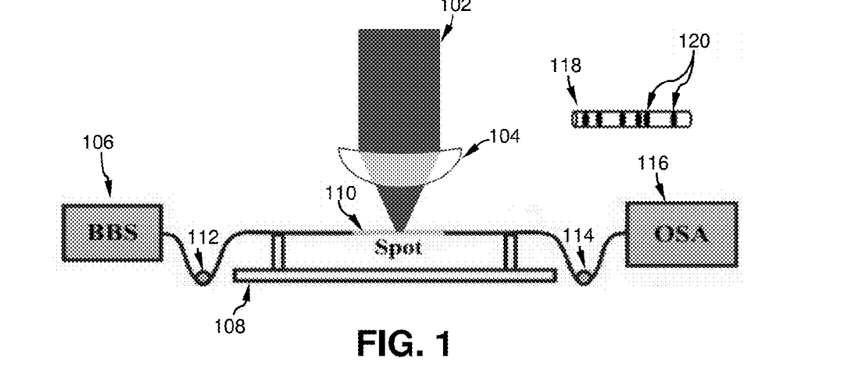
FIG. 1 is a schematic illustration of an exemplary configuration for a $CO_2$ laser writing system according to one embodiment of the present invention.

FIG. 1 shows a laser based RDFB fiber writing system 100 according to one embodiment of the present invention. RDFB fiber writing system 100 include a laser beam 102, a lens 104, a broad band light source (BBS) 106, pre-alignment translation stage 108, a jacket-off fiber section 110, weights 112 and 114 and an optical spectrum analyzer (OSA) 116. The RDFB fiber writing system 100 acts on the jacket-off fiber section 110 to produce a laser-modified RDFB fiber 118. Laser beam 102, point-focused by lens 104, is used to inscribe a set of laser-irradiated index-modified points 120 along a section of the jacket-off fiber 110 that is straightened across the pre-alignment translation stage 108 by using weights 112 and 114 on either side. The pre-alignment translation stage 108 is used for adjusting the position of the fiber section 110 while weights 112 and 114 are used in order to keep the fiber section 110 taut during the laser writing operation. BBS 106 is used in conjunction with OSA 116 for monitoring the optical characteristic of the fiber section 110 as it is being modified by the laser beam 102 to create RDFB fiber 118. In one embodiment of the present invention, fiber section 110 is a 15-cm-long jacket-off Single Mode Fiber 28 (SMF-28) and laser beam 102 is a $CO_2$ laser that generates a maximum output power of approximately 10 W with a repetition rate of approximately 5 kHz and a focused beam diameter of approximately 200 μm.

In one exemplary embodiment of the present invention laser-written RDFB fiber 118 is fabricated by inscribing a total of 100 $CO_2$-laser-irradiated points along a 10 cm section of SMF-28 with the random distance between adjacent irradiated points arbitrarily selected in the range of 0.5 mm to 1 mm. The number and spacing of the laser-irradiated points can vary depending upon desired purpose of the resulting fiber. In one exemplary embodiment of the present invention the $CO_2$ laser is operated at the wavelength of approximately 10.6 μm which overlaps with an OH absorption band in fused silica, leading to a quick thermal response and a sharp temperature rise in the fiber. As a result refractive indices of the $CO_2$-laser-irradiated points are modulated through localized residual thermal stress in the fiber owing to thermal gradient shined by the $CO_2$ laser. Because of the large focal point of the $CO_2$ laser, an asymmetric temperature gradient forms across the core and cladding, providing index modulation in both longitudinal and transverse directions, which creates a sequence of 2D scattering centers 120 in laser-written RDFB fiber 118.[15] Appropriate laser power as well as exposure time may be adjusted to guarantee no damage to the fiber during the heat-treating process by the $CO_2$ laser.

In the context of the present invention, laser-written RDFB fiber maybe interchangeably referred to as laser-modified RDFB fiber.

Figure 2:
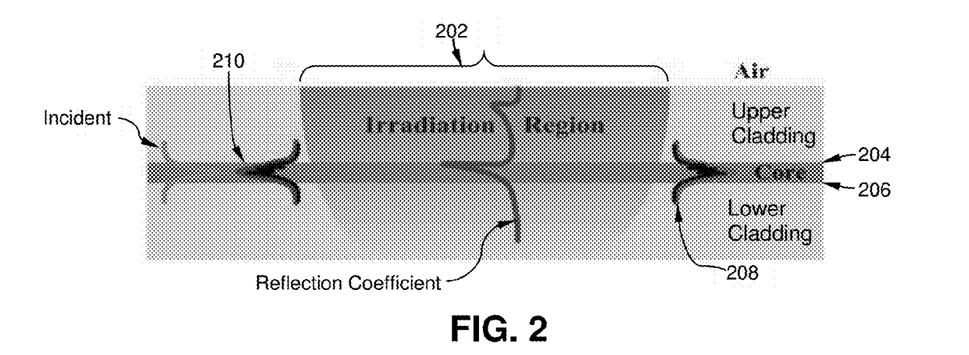
FIG. 2 illustrates the asymmetric refractive index profile of an ideal laser-irradiated point, according to one embodiment of the present invention.

The asymmetric refractive index profile of an ideal laser-irradiated point 202 is illustrated in FIG. 2. The asymmetric modulation of the refractive index results in the greatest reflection coefficient at the upper core/cladding interface 204 with the reflection coefficient tapering off to a minimum value at the lower core/cladding interface 206. The side-writing method with the $CO_2$ laser induces high order modes, many of which are leaky modes (also called radiation modes), within the optical fiber. The associated high loss is due to the asymmetric nature of laser inscription process, which creates more random modes within the optical fiber, hence contributing to the low intensity noise.

The optical transmission profile 208 through the index-modified laser-irradiated point 202 follows the inverse pattern relative to the reflection profile 210.

Figure 3:
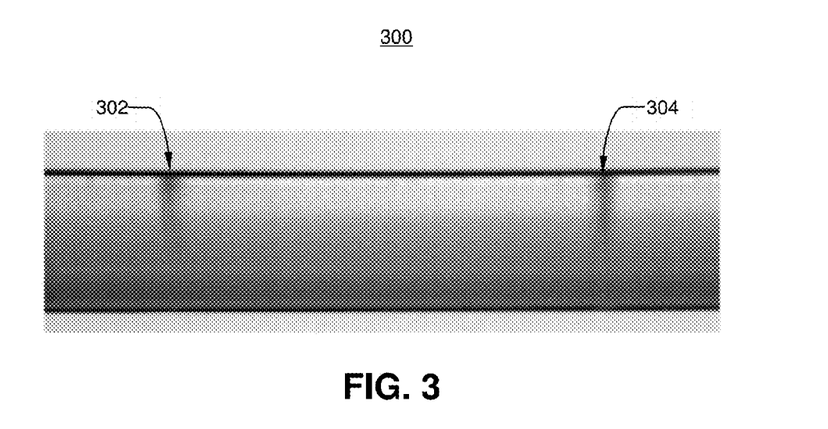
FIG. 3 is a microscope image of an irradiation point, according to one embodiment of the present invention.

FIG. 3 illustrates an optical micrograph 300 of an index modified region corresponding to a SMF-28 under a $CO_2$ laser output power of approximately 1.5 to 1.6 W and a laser beam scanning speed of approximately 1.5 mm/s, in accordance to one embodiment of the present invention. The absence of physical deformation or damage on the fiber and the index modulation is evidenced by two distinct lines 302 and 304 in FIG. 3. The distinct lines 302 and 304 constitute the high reflection regions due to high index modulation from $CO_2$ laser.

Figure 4:
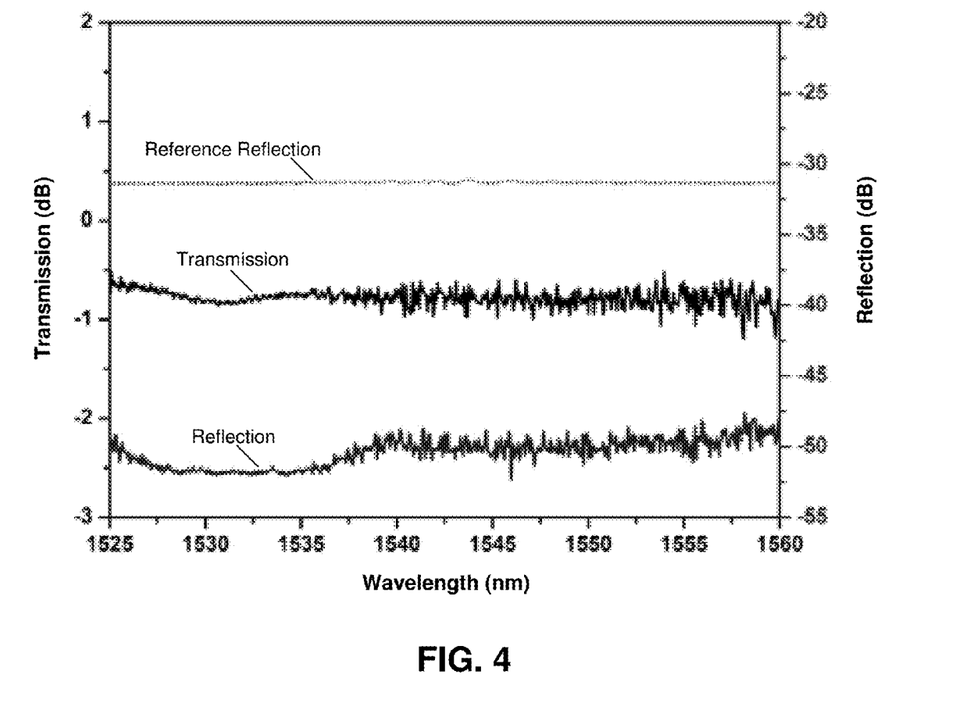
FIG. 4 is a graph illustrating the measured transmission and reflection spectra of a laser-written random distributed feedback fiber and the reflection spectrum of a standard non-uniform fiber, according to one embodiment of the present invention.

A small proportion of the incident light propagating through the laser-modified RDFB fiber 118 is reflected backwards due to the large refractive index difference between the unmodified and laser-modified regions along the fiber. Reflections from multiple laser-modified regions along the fiber, functioning as a distributed reflector, effectively provide a RDFB signal for realization of a narrow linewidth fiber laser. FIG. 4 illustrates the reflection and transmission spectra of the laser-modified RDFB fiber 118. The presence of a RDFB signal can be deduced from the observations of interference fringes in the measured reflection spectra, caused by mutual interference among randomly distributed reflection points along the fiber. A comparison is further made by measuring the reflection spectrum of a 5.4-km non-uniform fiber (NUF) with a continuous change in the core diameter along the fiber. The reflection spectrum of the NUF is illustrated as reference reflection in FIG. 4. Backscattered light in the NUF is due to: a) Rayleigh scattering due to frozen-in non-homogeneous structural changes at a molecular level; and b) mode field diameter variations along the fiber caused by the gradual core diameter change. In FIG. 4, the reflection spectrum of the NUF shows an approximately flat curve with low interferometric visibility in the entire BBS wavelength window from 1525 nm to 1560 nm. This is in close agreement with the theoretical predictions. Although the reflection of the laser-modified RDFB fiber 118 is about 20 dB lower than that of the NUF, its reflection coefficient is estimated to be hundreds of times higher than that of the NUF when normalized by the fiber length.

Figure 5:
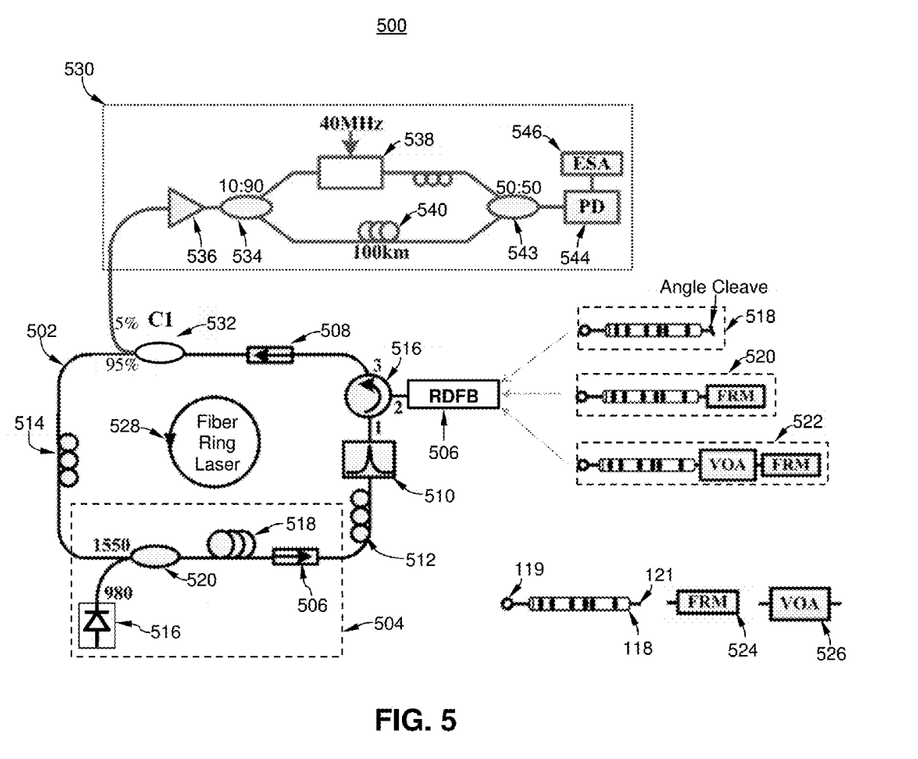
FIG. 5 is a schematic illustration of an exemplary configuration for fiber ring laser with three different RDFB element configuration options and a linewidth measurement setup shown in conjunction with fiber ring resonator configuration, according to one embodiment of the present invention.

The reflectivity measurements illustrated in FIG. 4 indicate that randomly spaced laser-modification of the refractive index in a short length of fiber can boost the distributed backscattering of incident light enough to potentially provide the necessary RDFB signal for realization of a single mode fiber laser system. FIG. 5 illustrates an exemplary fiber laser system 500 with single mode operation utilizing a RDFB element based on a short laser-modified RDFB fiber 118, in accordance to one embodiment of the present invention. The fiber laser system 500 may comprise a fiber ring resonator 502, and a RDFB element 506 to facilitate single mode lasing. In one exemplary embodiment of the present invention the fiber ring resonator 502 may comprise an optically pumped erbium-doped fiber amplifier (EDFA) 504 as gain medium to compensate the resonator losses in each round trip of the light, optical isolators 506 and 508 to enforce a unidirectional operation in fiber ring resonator 502, an optical band-pass filter (OBPF) 510 with, for example, 3 GHz bandwidth for removing unwanted amplified spontaneous emission noise, polarization controllers (PC) 512 and 514 for ensuring orthogonal states of polarization at input and output ends of the EDFA 504 in order to minimize interference related background noise. In one embodiment, EDFA 502 may be built using, for example, a 980 nm laser diode 516 to pump an erbium-doped fiber 518 with a length of, for example, 7 meters using a 980/1550 WDM 520.

In one disclosed embodiment of the present invention an optical circulator 516 may be used to incorporate the RDFB element 506 into the fiber ring resonator 502. In FIG. 5 three exemplary configurations of RDFB element 506 corresponding to laser-modified RDFB fiber-based structures 518, 520 and 522 are illustrated. laser-modified RDFB fiber-based structure 518 comprises a laser-modified RDFB fiber 118 with a proximal fiber end 119 for connection to port 2 of OC 516 and an angle cleave on a distal fiber end 121 in order to hamper backward propagation of end-face reflection. Laser-modified RDFB fiber-based structure 520 comprises a laser-modified RDF fiber 118 with a proximal fiber end 119 for connection to port 2 of OC 516 and a distal fiber end 121 terminating into a faraday rotator mirror (FRM) 524. Laser-modified RDFB fiber-based structure 522 comprises a laser-modified RDF fiber 118 with a proximal fiber end 119 for connection to port 2 of OC 516 and a distal fiber end 121 for connection to FRM 524 through a variable Optical Attenuator (VOA) 526.

The spectral output of the fiber ring laser 528 generated in the fiber ring resonator 502 is obtained using a measurement system 530 which generates a delayed self-heterodyne interference signal using a two-arm Mach-Zehnder interferometer (MZI) connected to the tap port of a 5% tap coupler (C1) 532 through a 10:90 optical coupler 534 and an EDFA 536. An acousto-optic modulator (AOM) 538 with a 40-MHz frequency shift is inserted in one arm of the MZI while a spool of 100-km SMF-28 540, for providing a signal delay that corresponds to a frequency resolution of 2 kHz, is inserted in the other arm of the MZI.[16] The resulting beat signal at the output of an optical coupler 542 may be detected by a photo-detector (PD) 544 with, for example, a frequency response range of approximately 350 MHz and an electrical spectrum analyzer (ESA) 546.

Figure 6:
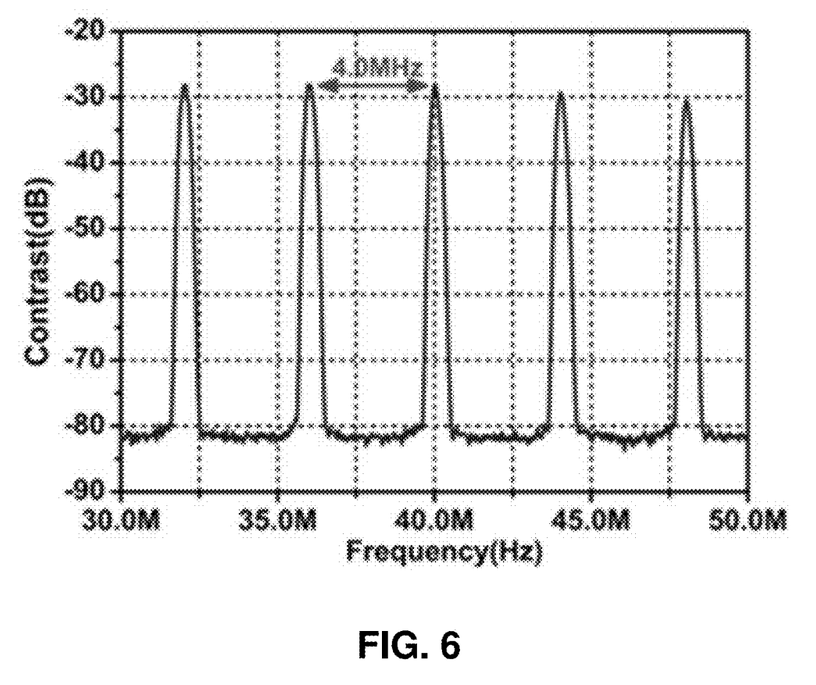
FIG. 6 is a graph illustrating the multiple longitudinal modes in a fiber ring cavity in absence of a structure for providing randomly distributed feedback (RDFB), according to one embodiment of the present invention.
Figure 7:
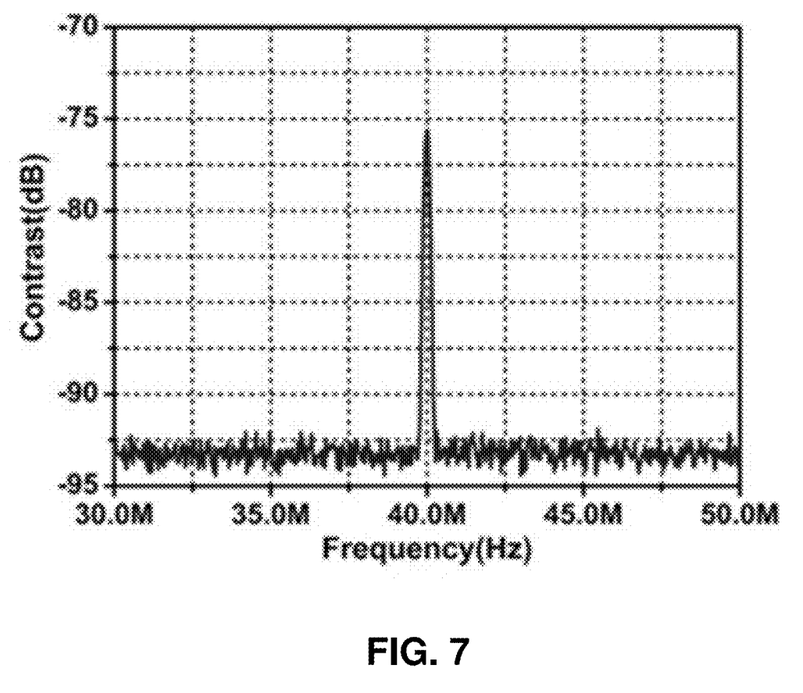
FIG. 7 is a graph illustrating the single-mode spectrum of fiber ring laser comprising a laser-modified RDFB fiber as an RDFB element, according to one embodiment of the present invention.

FIG. 6 shows the spectral output of fiber ring (FR) laser 528 when only FRM 524 is used in place of RDFB element 506. This corresponds to a standard fiber ring configuration without a randomly distributed feedback property. The transmission light generated by EDFA 504 enters into FRM 524 through port 2 of OC 516 and is reflected back by FRM 524 and subsequently fed back into fiber ring resonator 502 through port 3 of OC 516. This results in a conventional multi-mode FR laser operation. EDFA 504 has a very broad gain curve compared to the small spacing between longitudinal modes of fiber ring resonator 502. Thus multiple longitudinal modes could lase simultaneously as indicated in FIG. 6 showing a longitudinal mode spacing of 4 MHz which matches well with a fiber ring resonator cavity length of approximately 51 m. The spectral measurement illustrated in FIG. 7 corresponds to FR laser 528 utilizing laser-modified RDFB fiber-based structure 518 which corresponds to laser-modified RDFB fiber 118 angle cleaved at distal fiber end 121 to suppress unwanted end-face reflections. A beat spectrum with one dominant peak corresponding to single longitudinal mode operation is observed in FIG. 7. This is because back-reflections from randomly distributed scattering centers in laser-modified RDFB fiber 118 represent variable effective cavity lengths and consequently introduce different longitudinal modes with variable mode spacing in FR laser 528. Mode suppression takes place as one dominant cavity mode becomes stronger than the rest of longitudinal modes through mode competition. This configuration exhibits the desired narrow-linewidth single mode operation fiber laser operation, however, because of the relative high level of loss in the laser-modified RDFB fiber 118, brought on by the asymmetric index modulation, the measured single-mode FR laser output in FIG. 7 exhibits a low contrast, indicating low Q-factor cavity and increased lasing threshold.

Figure 8:
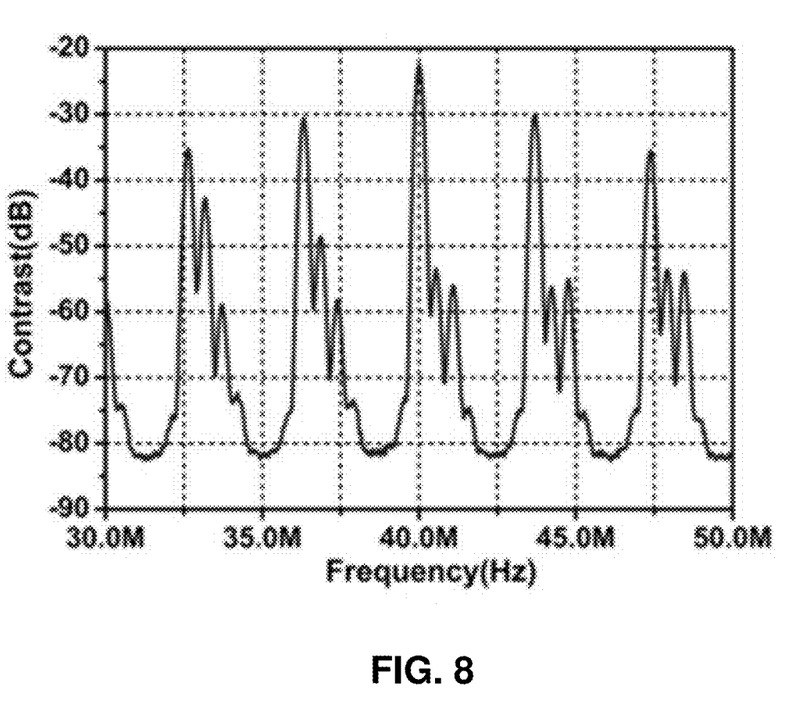
FIG. 8 is a graph illustrating beat spectrum associated with RDFB element configuration corresponding to structure 520 in FIG. 5.

The RDFB element 506 configuration corresponding to laser-modified RDFB fiber-based structure 520 further incorporates a FRM 524 at distal end 121 of laser-modified RDFB fiber 118, thus causing un-scattered transmission light passing through 118 to be reflected back by FRM 524 and fed back into fiber ring resonator 502 through port 3 of OC 516 where it combines with the distributed backscattering feedback signal generated by laser-modified RDFB fiber 118. FIG. 8 illustrates the spectral output of FR laser 528 when RDFB element 506 is represented by laser-modified RDFB fiber-based structure 520. Although signal contrast has improved, the measured spectrum clearly displays multiple side modes besides the dominant and high-order fixed cavity modes. This is due to the transmission mode contributions to the gain bandwidth of EDFA 504. It should be emphasized that, both the longitudinal and transverse modes contribute to the beat spectrum due to 2D modulation.

Figure 9:
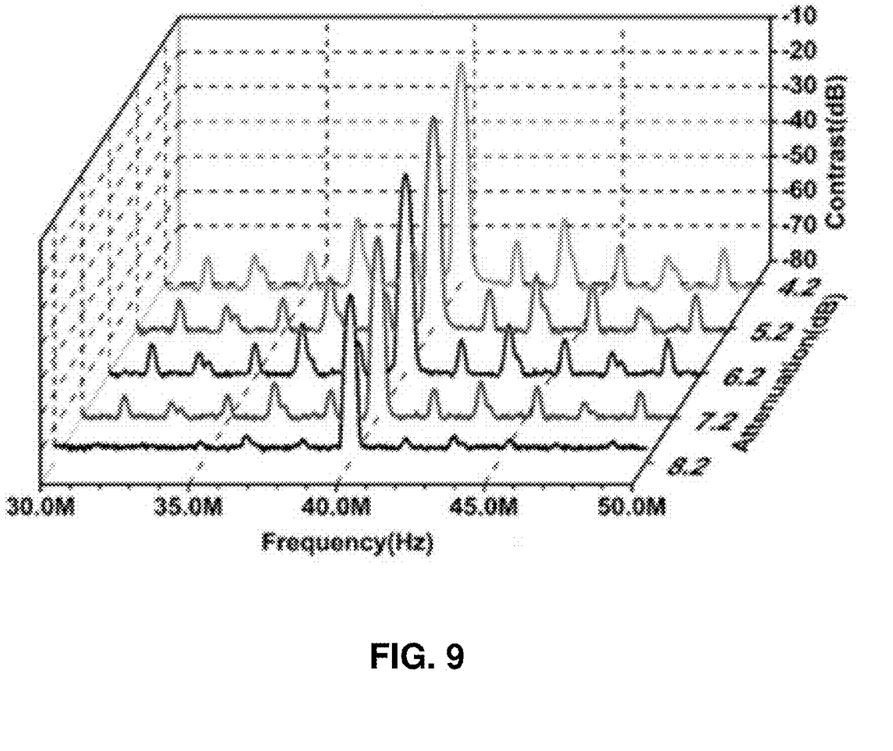
FIG. 9 is a graph illustrating the spectral output of the fiber ring laser at different attenuation levels associated with RDFB element configuration corresponding to structure 522 in FIG. 5.

The addition of an optical loss device, represented by VOA 526, introduced in between laser-modified RDFB fiber 118 and FRM 524 in laser-modified RDFB fiber-based structure 522, optimizes the power between the distributed backscattered feedback signal from laser-modified RDFB fiber 118 and reflected transmission signal from FRM 524, balancing the loss and gain in the fiber cavity such that fixed cavity modes are suppressed and only the highest gain lasing mode remains. The output spectrum of FR laser 528 with RDFB element represented by laser-modified fiber-based structure 522 is illustrated in FIG. 9 for different attenuation levels set by VOA 526.

Figure 10:
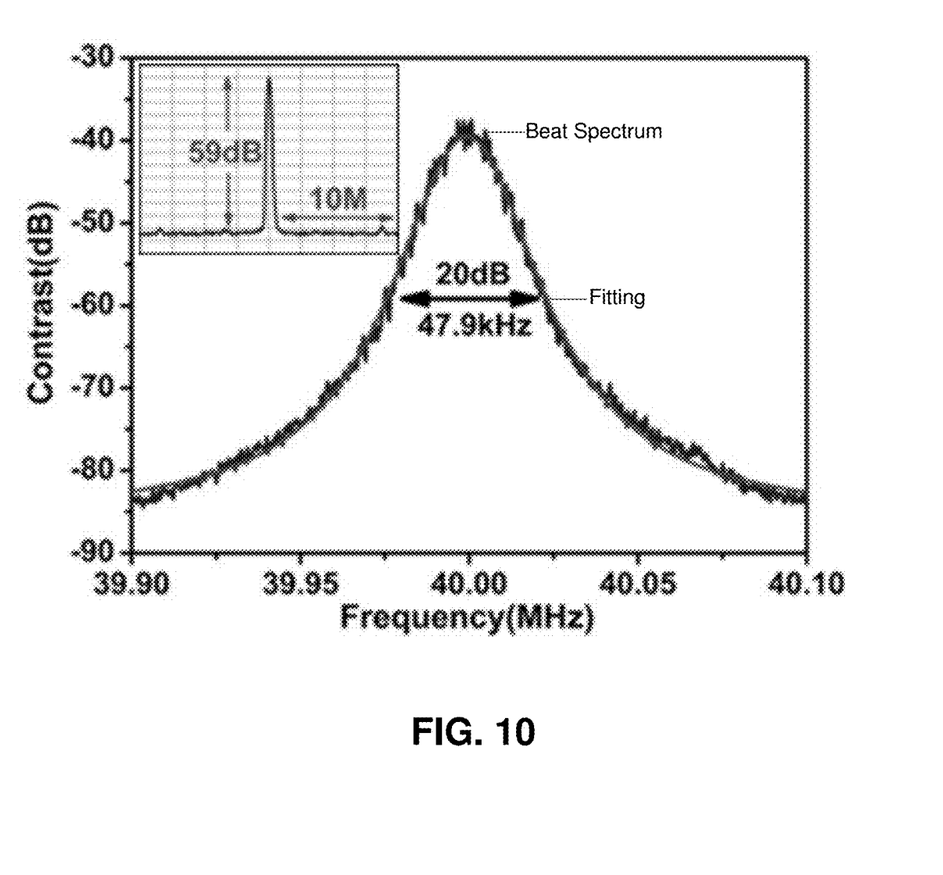
FIG. 10 is a graph illustrating a single-mode spectral output with a 200 kHz frequency span and a 20 dB bandwidth of 47.9 kHz, corresponding to a laser-written RDFB fiber based fiber ring laser. The inset graph shows a single-mode spectrum with a 20 MHz frequency span.

The suppression of the weak transverse modes is followed by the gradual suppression of longitudinal modes, thus making the smooth laser line. Randomly distributed scattering centers in the laser-modified RDFB fiber 118 act as mode suppressing feature and ensure a single-longitudinal-mode oscillation in the fiber cavity. Laser linewidth is extracted by using 20-dB down linewidth from the self-heterodyne spectrum.[16] A typical beat spectrum with a 200 kHz frequency span is shown in FIG. 10, in which 20-dB bandwidth of 47.9 kHz is observed corresponding to a 3-dB Lorentzian linewidth of 2.4 kHz. The inset of FIG. 10 exhibits a typical beat spectrum with side-mode suppression ratio (SMSR) as high as 59 dB under a single-mode operation over a frequency range of approximately 20 MHz.

Figure 11:
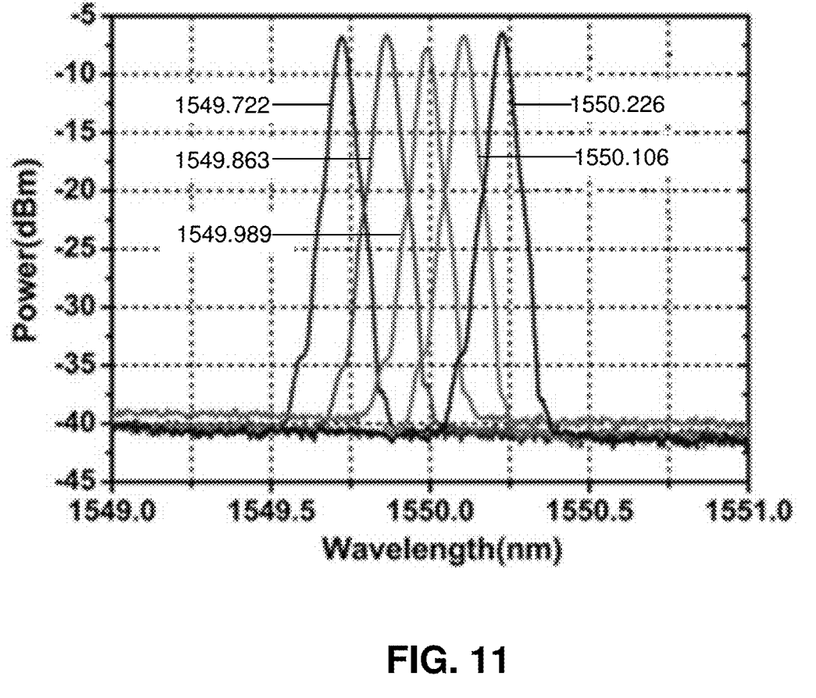
FIG. 11 is a graph illustrating spectral output of laser-written RDFB fiber based fiber ring laser centered at different wavelengths thus demonstrating the wavelength tunability of the disclosed fiber ring laser configuration.

FIG. 11 illustrates the wavelength tunability of the proposed laser which is essentially determined by the OBPF with a wavelength tuning range from 1549.722 nm to 1550.226 nm.[17] FIG. 11 also shows that the maximum peak power variation is less than 2 dB.

Figure 12:
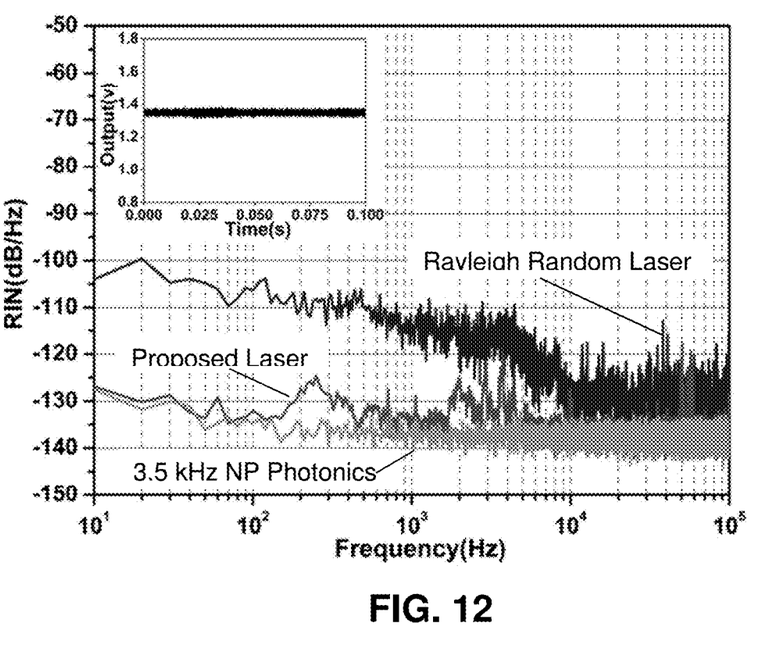
FIG. 12 is a graph illustrating the relative intensity noise of three different lasers including a Rayleigh random laser, the disclosed fiber ring laser and a 3.5 kHz NP photonics laser as a function of frequency. The inset graph illustrates the time-domain signal of the disclosed laser output, according to one embodiment of the present invention.

FIG. 12 illustrates the measured relative intensity noise (RIN) of FR laser 528 utilizing laser-modified RDFB fiber-based structure 522 wherein laser modifications are made with a $CO_2$ laser, a RBS-based fiber laser with 5.4-km NUF,[18] and a commercial NP photonics fiber laser.[19] The measurements are taken by launching a laser emission onto a PD connected to an oscilloscope and taking the Fourier transform of the photocurrent. The inset of FIG. 12 shows a time-domain output signal of FR laser 528 utilizing laser-modified RDFB fiber-based structure 522 wherein laser modification are made using a $CO_2$ laser.

Time-domain signal confirms the single-wavelength operation of disclosed embodiment of laser-modified RDFB fiber-based laser system and the corresponding low-frequency intensity noise is approximately below −120 dB/Hz. It is noted that disclosed laser-modified RDFB fiber-based laser system has much lower RIN than the RBS-based fiber laser, and has a comparable value to the NP photonics fiber laser which incorporates an integrated electrical feedback mechanism to stabilize the laser output. The single-wavelength, low Intensity noise behavior of the disclosed exemplary fiber ring laser is attributed to: a) the discrete-mode structure of the laser-modified RDFB fiber; and b) the highly compact structure of laser-modified RDFB fiber. The standard Non-uniform feedback fiber is an intrinsically disordered medium that contains numerous scattering centers occurring at very short and irregular intervals. The high density of mode numbers, leads to greater number of modes competing within the gain bandwidth of the fiber ring laser. The continuous mode competition inevitably leads to higher low-frequency intensity noise. Incorporating the extremely long NUF into a ring laser configuration would reduce the frequency noise at the cost of high intensity noise. In the disclosed exemplary laser-modified RDFB fiber, a finite number of $CO_2$-laser-modulated regions form spatially isolated scattering centers resulting in a discrete-mode structure. The distributed feedback from randomly spaces laser-modified planes greatly extends the effective fiber cavity length resulting in suppression of the frequency noise. Introduction of a VOA as demonstrated by the exemplary laser-modified RDFB-fiber based structure 522 results in reduced mode competition in fiber ring resonator as low gain modes are suppressed. Reducing the number of resonator modes competing within the gain bandwidth reduces the relative intensity noise (RIN) of the fiber ring laser output. In the case of Rayleigh scattering in long Non-uniform feedback fiber the presence of many modes with comparable power makes mode suppression inefficient.

An extremely long NUF length is prerequisite for providing enough feedback to realize a single-mode operation due to its low backscattering coefficient. Contrarily, the high reflection coefficient of the laser-modified RDFB fiber allows for a compact RDFB structure resulting in smaller RIN. Furthermore, the short cavity configuration is less sensitive to external perturbations (sound wave, mechanical vibration, and temperature variation) than the long cavity configuration. The peaks among the RIN spectrum of the proposed laser is due to a relative low contrast which is limited mainly by the available pump source.[20]

Figure 13:
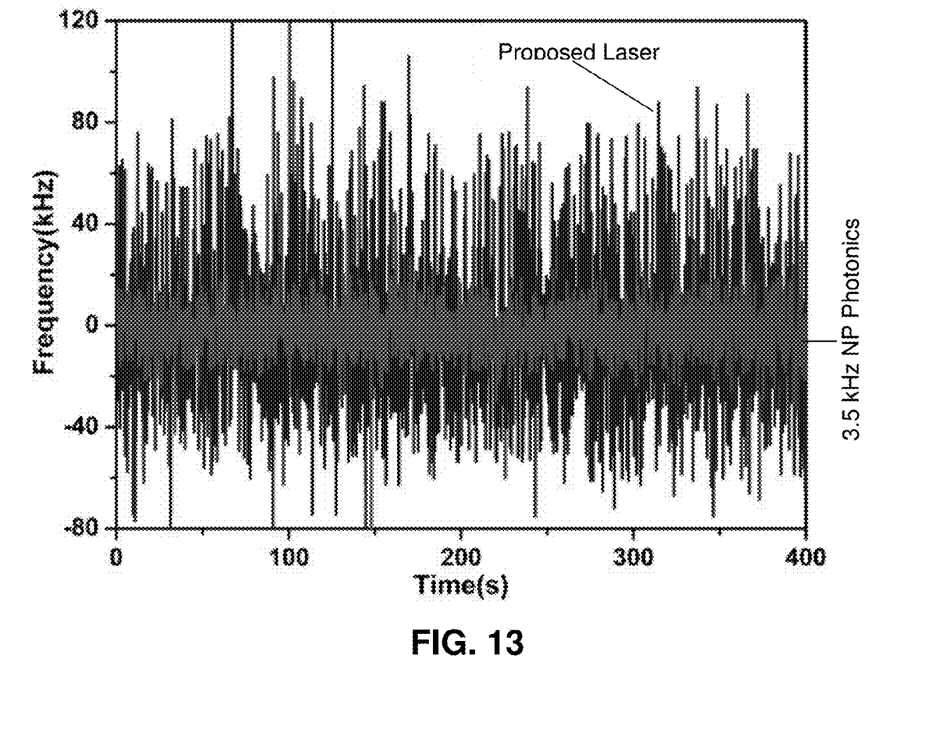
FIG. 13 is a graph illustrating the measured frequency jitter of the beat signal for the disclosed fiber ring laser and a 3.5 kHz NP photonics laser, according to one embodiment of the present invention.

In order to characterize the frequency stability of the disclosed exemplary fiber ring laser with RDFB provided using, for example, a $CO_2$ laser modified RDFB fiber, the frequency jitter of the beat signals recorded in 400 seconds with a time interval of 0.2 s is illustrated in FIG. 13. It is observed from measurement trace in FIG. 13 that the measured frequency jitter stays within a range of approximately ±50 kHz. The Allen standard deviation[21] is calculated to be approximately $3.41 \times 10^{-11}$ within an average time of approximately 5 seconds. The Allen standard deviation of the NP photonics fiber laser is estimated to be approximately $1 \times 10^{-11}$ within an average time of approximately 5 seconds which is on the same magnitude as the proposed laser scheme through RDFB.

The disclosed embodiments of the present invention provide a method and apparatus for the generation a frequency stabilized, low intensity noise fiber ring laser with RDFB based on, for example, $CO_2$-laser-modified SMF-28. The $CO_2$-laser-irradiated points perform well as a distributed reflector with a high reflection coefficient. The disclosed exemplary fiber ring laser exhibits low RIN and high frequency stability through loss element. Owing to these distinct features, such a laser may find applications in high-resolution spectroscopy, coherent communications and optical sensing, providing a new option for a RDFB based fiber laser design.

All documents, patents, journal articles and other materials cited in the present application are incorporated herein by reference.

Having described the various embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

REFERENCES

The following references are referred to above and/or describe technology that may be used with the present invention and contents and disclosure of the following references are incorporated herein by reference:
1. N. M. Lawandy, R. M. Balachandran, A. S. L. Gomes, and E. Sauvain, Nature 368, 436 (1994).
2. G. R. Williams, S. B. Bayram, S. C. Rand, T. Hinklin, and R. M. Laine, Phys. Rev. A 65, 013807 (2001).
3. H. Cao, Waves Random Media 13, R1 (2003).
4. R. C. Polson and Z. V. Vardeny, Appl. Phys. Lett. 85, 1289 (2004).
5. S. Gottardo, S. Cavalieri, 0. Yaroshchuk, and D. S. Wiersma, Phys. Rev. Lett. 93, 263901 (2004).
6. S. K. Turitsyn, S. A. Babin, A. E. El-Taher, P. Harper, D. V. Churkin, S. I. Kablukov, J. D. Ania-Castanon, V. Karalekas, and E. V. Podivilov, Nat. Photon. 4, 231 (2010).
7. A. A. Fotiadi, Nat. Photon. 4, 204 (2010).
8. M. Pang, X. Bao, and L. Chen, Opt. Lett. 38, 1866 (2013).
9. C. J. S. de Matos, L. de S. Menezes, A. M. Brito-Silva, M. A. Martinez Gámez, A. S. L. Gomes, and C. B. de Araújo, Phys. Rev. Lett. 99, 153903 (2007).
10. M. Gagné and R. Kashyap, Opt. Express 17, 19067 (2009).
11. N. Lizárraga, N. P. Puente, E. I. Chaikina, T. A. Leskova, and E. R. Méndez, Opt. Express 17, 395 (2009).
12. Z. Hu, B. Miao, T. Wang, Q. Fu, D. Zhang, H. Ming, and Q. Zhang, Opt. Lett. 38, 4644 (2013).
13. M. Pang, S. R. Xie, X. Y. Bao, D. P. Zhou, Y. G. Lu, and L. Chen, Opt. Lett. 37, 3129 (2012).
14. J. D. Ania Castañón, S. A. Babin, D. V. Churkin, A. El-Taher, P. Harper, S. I. Kablukov, V. Karalekas, V. K. Mezentsev, E. V. Podivilov, and S. K. Turitsyn, Phys. Rev. Lett. 103, 133901 (2009).
15. Y. J. Rao, Y. P. Wang, Z. L. Ran, and T. Zhu, J. Lightwave Technol. 21, 1320 (2003).
16. D. Derickson, Fiber optic test and measurement, (Prentice Hall PTR, Upper Saddle River, N.J., USA, 1998)
17. S. A. Babin, A. E. El-Taher, P. Harper, E. V. Podivilov, and S. K. Turitsyn, Physical Review A 84, 021805 (2011).
18. T. Zhu, X. Bao, and L. Chen, J. Lightwave Technol. 29, 1802 (2011).
19. C. Spiegelberg, J. Geng, Y. Hu, Y. Kaneda, S. Jiang, and N. Peyghambarian, J. Lightwave Technol. 22, 57 (2004).
20. C. B. Su, J. Schlafer, and R. B. Lauer, Appl. Phys. Lett. 57, 849 (1990).
21. D. W. Allan, IEEE. Trans. Ultrason. Ferroelectr. Freq. Control. 34, 647 (1987).

What is claimed is:

1. A method comprising:
induces random distributed feedback within one or more fiber sections of a fiber ring laser to thereby produce single-mode lasing with a reduced frequency jitter and a reduced relative intensity noise in the fiber ring laser,
wherein inducing the random distributed feedback within the one or more fiber sections comprises modulating a refractive index at plurality of randomly spaced points along the one or more fiber sections of the fiber ring, and
wherein the plurality of random points comprise at least one hundred random points, wherein there is a random distance between each pair of adjacent random points of the plurality of random points, and wherein the random distance between each pair of adjacent random points is arbitrarily selected in the range of 0.5 to 1 mm.

2. The method of claim 1, wherein the fiber ring laser comprises a pumped erbium doped fiber as a gain medium.

3. The method of claim 1, wherein the method comprises removing unwanted amplified spontaneous noises using an optical band pass filter.

4. The method of claim 1, wherein a low frequency intensity noise of the fiber ring laser is below −120 dB/Hz.

5. The method of claim 1, wherein a measured frequency jitter of the fiber ring laser is approximately ±50 kHz.

6. The method of claim 1 wherein an Allen standard deviation of the fiber ring laser is approximately $3.41 \times 10^{-11}$.

7. An apparatus comprising:
a fiber ring laser comprising one or more random distributed feedback fiber sections configured to produce a single mode lasing with reduced frequency jitter and reduced relative intensity noise in the fiber ring laser,
wherein the one or more random distributed feedback fiber sections each comprise a plurality of randomly spaced refractive index modulation points, and
wherein the plurality of random points comprise at least one hundred random points, wherein there is a random distance between each pair of adjacent random points of the plurality of random points, and wherein the random distance between each pair of adjacent random points is arbitrarily selected in the range of 0.5 to 1 mm.

8. The apparatus of claim 7, wherein the fiber ring laser comprises an erbium-doped fiber amplifier (EDFA) as a gain medium.

9. The apparatus of claim 8, wherein the apparatus comprises two polarization controllers configured to ensure orthogonal states of polarization at input and output ends of the EDFA to thereby minimize interference related background noise.

10. The apparatus of claim 7, wherein the apparatus comprises two optical isolators configured to enforce a unidirectional operation in the fiber ring laser.

11. The apparatus of claim 7, wherein the apparatus comprises an optical band pass filter configured to remove unwanted amplified spontaneous noise in the fiber ring laser.

12. The apparatus of claim 7, wherein a low frequency intensity noise of the fiber ring laser is below −120 dB/Hz.

13. The apparatus of claim 7, wherein a measured frequency jitter of the fiber ring laser is approximately ±50 kHz.

14. The apparatus of claim 7, wherein an Allen standard deviation of the fiber ring laser is approximately $3.41 \times 10^{-11}$.

* * * * *